United States Patent
Onishi

(10) Patent No.: US 11,345,126 B2
(45) Date of Patent: May 31, 2022

(54) HEAT-SHRINKABLE MULTI-LAYERED FILM

(71) Applicant: GUNZE LIMITED, Ayabe (JP)

(72) Inventor: Yusuke Onishi, Shiga (JP)

(73) Assignee: GUNZE LIMITED, Kyoto (JP)

( * ) Notice: Subject to any disclaimer, the term of this patent is extended or adjusted under 35 U.S.C. 154(b) by 0 days.

(21) Appl. No.: 17/263,077

(22) PCT Filed: Sep. 19, 2019

(86) PCT No.: PCT/JP2019/036657
§ 371 (c)(1),
(2) Date: Jan. 25, 2021

(87) PCT Pub. No.: WO2020/080026
PCT Pub. Date: Apr. 23, 2020

(65) Prior Publication Data
US 2021/0308994 A1    Oct. 7, 2021

(30) Foreign Application Priority Data

Oct. 16, 2018   (JP) .............................. JP2018-195099

(51) Int. Cl.
*B32B 27/08* (2006.01)
*B32B 7/12* (2006.01)
*B32B 27/30* (2006.01)
*B32B 27/36* (2006.01)

(52) U.S. Cl.
CPC ............... *B32B 27/08* (2013.01); *B32B 7/12* (2013.01); *B32B 27/302* (2013.01); *B32B 27/36* (2013.01); *B32B 2250/05* (2013.01); *B32B 2250/24* (2013.01); *B32B 2270/00* (2013.01); *B32B 2307/736* (2013.01); *B32B 2519/00* (2013.01)

(58) Field of Classification Search
CPC ......... B32B 27/08; B32B 7/12; B32B 27/302; B32B 27/36; B32B 2250/24; B32B 2519/00; B32B 2270/00; B32B 2250/05; B32B 2307/736
See application file for complete search history.

(56) References Cited

U.S. PATENT DOCUMENTS

| 2009/0280341 A1 | 11/2009 | Maruichi et al. |
| 2013/0095371 A1* | 4/2013 | Zaikov .................... B32B 27/08 429/163 |
| 2013/0224412 A1 | 8/2013 | Muta et al. |
| 2016/0284248 A1 | 9/2016 | Banno et al. |
| 2017/0072668 A1* | 3/2017 | Ishikawa ................. B32B 27/36 |

FOREIGN PATENT DOCUMENTS

| JP | 61-41543 | 2/1986 |
| JP | 2002-351332 | 12/2002 |
| JP | 2010-240891 | 10/2010 |
| JP | 2010-264657 | 11/2010 |
| JP | 2011-056736 | 3/2011 |
| JP | 2011-170379 | 9/2011 |
| JP | 2012-210717 | 11/2012 |
| JP | 2015-160429 | 9/2015 |
| JP | 2016-062005 | 4/2016 |
| WO | 2014/148554 | 9/2015 |

OTHER PUBLICATIONS

Eastman Technical Data Sheet, Eastman Embrace LV Copolyester, Jul. 14, 2020, 3 pages (https://productcatalog.eastman.com/tds/ProdDatasheet.aspx?product=71068512&pn=Embrace+LV+(Low+Shrink+Force,+Versatile+Shrink+Curve)+Copolyester#_ga=2.230416091.679940691.1626680509-303723611.1626680509, (Jul. 19, 2021), XP055825399 [AP] 1-6).

* cited by examiner

*Primary Examiner* — Michael C Miggins
(74) *Attorney, Agent, or Firm* — Hamre, Schumann, Mueller & Larson, P.C.

(57) ABSTRACT

The present invention aims to provide a heat shrinkable multilayer film capable of providing a heat shrinkable label that can be easily torn along the perforation in both the TD and MD and also has excellent impact resistance and transparency. Provided is a heat shrinkable multilayer film including: front and back layers; an interlayer; and adhesive layers, wherein the front and back layers and the interlayer are stacked with the adhesive layers interposed therebetween, the front and back layers each contain a polyester resin, and the interlayer contains a polystyrene resin in an amount of 80 to 99% by weight and a polyester resin in an amount of 1 to 20% by weight.

5 Claims, No Drawings

HEAT-SHRINKABLE MULTI-LAYERED FILM

TECHNICAL FIELD

The present invention relates to a heat shrinkable multilayer film capable of providing a heat shrinkable label that can be easily torn along the perforation in both the TD and MD and also has excellent impact resistance and transparency.

BACKGROUND ART

Many recent containers such as plastic bottles and metal cans have a shrink label produced by printing images and the like on a base film made of a heat shrinkable resin film.

Mainstream shrink labels are those containing polystyrene resins because they have excellent low-temperature shrinkability. However, polystyrene resin films have insufficient heat resistance. Thus, for example, if a plastic bottle with such a shrink label falls over during heating in a warmer in a convenience store, the label may shrink and be distorted or torn. Polystyrene resin films also have insufficient solvent resistance, and thus may shrink or dissolve due to adherence of oil when used to package oil-containing products.

Instead of polystyrene resin films, polyester films, which have excellent heat resistance and solvent resistance, have also been used as shrink labels. However, polyester films have poor low-temperature shrinkability and rapidly shrink, and thus easily wrinkle when attached to a container. Many shrink films have perforation for tearing so that shrink labels can be easily torn off from used containers for the recycling of the containers. However, polyester films are difficult to tear along the perforation, which may make it difficult to tear labels off from containers.

Patent Literature 1 discloses a hard multilayer shrinkable film including an interlayer containing a polystyrene resin, outer surface layers containing a polyester resin, and adhesive layers containing an olefin resin, the outer surface layers being stacked on the interlayer with the adhesive layers therebetween. Patent Literature 2 discloses a shrink label including a base film. The base film includes an interlayer containing a polystyrene resin and outer surface layers containing a polyester resin made of a specific monomer, the outer surface layers being stacked on both surfaces of the interlayer with no adhesive layer therebetween. These shrink labels including multilayer films have excellent low-temperature shrinkability and are easily torn along the perforation owing to the polystyrene resin-containing interlayer. In addition, these shrink labels also have excellent solvent resistance and heat resistance owing to the polyester resin-containing outer surface layers covering the interlayer.

CITATION LIST

Patent Literature

Patent Literature 1: JP S61-41543 A
Patent Literature 2: JP 2002-351332 A

SUMMARY OF INVENTION

Technical Problem

Meanwhile, for example, containers for supplements and containers for medicines have a shrink label attached as a lid in such a way that it covers the entire container including the mouth so as to guarantee the virginity of the product. When the product in such a container is used, the shrink label covering the mouth is removed, whereas the shrink label on the body of the bottle is usually not removed in view of design quality. Although the films disclosed in Patent Literatures 1 and 2 are easily torn along the perforation for removal of a shrink label, tearing a label including such a film along the perforation may cause tearing of the label on the body. Moreover, a label including such a film is difficult to tear along the perforation when the label is removed along the perforation formed in the circumferential direction of the mouth, and thus may be torn at a portion other than the perforation. Furthermore, a label including such a film may tear when subjected to strong tensile force during printing or when subjected to strong impact from, for example, dropping the container to which the label is attached.

In view of the situation in the art, the present invention aims to provide a heat shrinkable multilayer film capable of providing a heat shrinkable label that can be easily torn along the perforation in both the TD and MD and also has excellent impact resistance and transparency.

Solution to Problem

The present invention relates to a heat shrinkable multilayer film including: front and back layers; an interlayer; and adhesive layers, wherein the front and back layers and the interlayer are stacked with the adhesive layers interposed therebetween, the front and back layers each contain a polyester resin, and the interlayer contains a polystyrene resin in an amount of 80 to 99% by weight and a polyester resin in an amount of 1 to 20% by weight.

The present invention is described in detail below.

The present inventor arrived at a heat shrinkable multilayer film in which front and back layers and an interlayer are stacked with adhesive layers interposed therebetween, and in which the front and back layers each contain a polyester resin, and the interlayer contains a mixed resin containing a polystyrene resin and a polyester resin at predetermined proportions. The inventors found out that use of this heat shrinkable film can prevent undesired tearing during removal of a label, and also can prevent a label from ripping even when external force is applied during printing or after attaching the label. The inventor thus completed the present invention.

The heat shrinkable multilayer film of the present invention has a structure in which the front and back layers and the interlayer are stacked with the adhesive layers interposed therebetween.

The "front and back layers" as used herein means both the front layer and the back layer. The heat shrinkable multilayer film of the present invention has a structure in which the interlayer is interposed between the front layer and the back layer.

(Front and Back Layers)

The front and back layers each contain a polyester resin.

The polyester resin constituting the front and back layers is obtainable by polycondensation of a dicarboxylic acid and a diol.

The dicarboxylic acid is not limited. Examples thereof include o-phthalic acid, terephthalic acid, isophthalic acid, succinic acid, adipic acid, sebacic acid, azelaic acid, octylsuccinic acid, cyclohexane dicarboxylic acid, naphthalene dicarboxylic acid, fumaric acid, maleic acid, itaconic acid, decamethylene carboxylic acid, anhydrides thereof, and lower alkyl esters thereof.

The diol is not limited. Examples thereof include aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, and 2-ethyl-1,3-hexanediol; and alicyclic diols such as 2,2-bis(4-hydroxycyclohexyl)propane, adducts of alkylene oxide with 2,2-bis(4-hydroxycyclohexyl)propane, 1,4-cyclohexanediol, and 1,4-cyclohexanedimethanol.

Suitable among the polyester resins are those containing a component derived from terephthalic acid as a dicarboxylic acid component and a component derived from ethylene glycol and 1,4-cyclohexanedimethanol as a diol component. By using such a polyester resin, particularly high heat resistance and solvent resistance can be imparted to the resulting heat shrinkable multilayer film of the present invention.

The lower limit of the amount of a component derived from terephthalic acid in 100 mol % of the dicarboxylic acid component in the polyester resin is preferably 70 mol %, more preferably 80 mol % and the upper limit thereof is preferably 100 mol %, more preferably 95 mol %.

The lower limit of the amount of a component derived from isophthalic acid in 100 mol % of the dicarboxylic acid component in the polyester resin is preferably 0 mol %, more preferably 5 mol % and the upper limit thereof is preferably 30 mol %, more preferably 20 mol %.

The lower limit of the amount of a component derived from ethylene glycol in 100 mol % of the diol component in the polyester resin is preferably 50 mol %, more preferably 60 mol % and the upper limit thereof is preferably 80 mol %, more preferably 70 mol %.

The lower limit of the amount of a component derived from 1,4-cyclohexanedimethanol in 100 mol % of the diol component in the polyester resin is preferably 10 mol %, more preferably 13 mol % and the upper limit thereof is preferably 40 mol %, more preferably 35 mol %.

The lower limit of the amount of a component derived from diethylene glycol in 100 mol % of the diol component in the polyester resin is preferably 0 mol %, more preferably 10 mol % and the upper limit thereof is preferably 30 mol %, more preferably 25 mol %.

The lower limit of the amount of a component derived from 1,4-butanediol in 100 mol % of the diol component in the polyester resin is preferably 0 mol %, more preferably 5 mol % and the upper limit thereof is preferably 40 mol %, more preferably 35 mol %.

The lower limit of the glass transition temperature of the polyester resin is preferably 30° C., more preferably 55° C. and the upper limit thereof is preferably 95° C., more preferably 90° C.

The glass transition temperature can be measured with a differential scanning calorimeter (DSC).

The lower limit of the tensile modulus of elasticity of the polyester resin is preferably 1000 MPa, more preferably 1500 MPa and the upper limit thereof is preferably 4000 MPa, more preferably 3700 MPa.

The tensile modulus of elasticity can be measured by a method in conformity with ASTM-D992 (Test A).

The front and back layers each may be constituted by one polyester resin having the above composition alone, or a combination of two or more polyester resins each having the above composition.

The front and back layers may optionally contain additives such as antioxidants, heat stabilizers, ultraviolet absorbers, light stabilizers, lubricants, antistatic agents, antiblocking agents, flame retardants, antimicrobials, fluorescent whitening agents, and colorants.

(Interlayer)

The interlayer contains a polystyrene resin.

Examples of the polystyrene resin constituting the interlayer include aromatic vinyl hydrocarbon-conjugated diene copolymers. Aromatic vinyl hydrocarbon-conjugated diene copolymers have excellent low-temperature shrinkability, and thus allow the resulting heat shrinkable multilayer film to be easily attached to a container without wrinkling or the like. Moreover, aromatic vinyl hydrocarbon-conjugated diene copolymers allow the resulting heat shrinkable multilayer film or the resulting heat shrinkable label to be easily torn along the perforation in the MD.

The "aromatic vinyl hydrocarbon-conjugated diene copolymer" as used herein means a copolymer containing a component derived from an aromatic vinyl hydrocarbon and a component derived from a conjugated diene.

The aromatic vinyl hydrocarbon is not limited. Examples thereof include styrene, o-methylstyrene, and p-methylstyrene. These may be used alone or in combination of two or more thereof. The conjugated diene is not limited. Examples thereof include 1,3-butadiene, 2-methyl-1,3-butadiene, 2,3-dimethyl-1,3-butadiene, 1,3-pentadiene, and 1,3-hexadiene. These may be used alone or in combination of two or more thereof.

The lower limit of the amount of a styrene component in the polystyrene resin constituting the interlayer is preferably 60% by weight, more preferably 70% by weight and the upper limit thereof is preferably 90% by weight, more preferably 85% by weight.

When the polystyrene resin constituting the interlayer is a mixed resin containing multiple polystyrene resins in combination, the amount of the styrene component in the polystyrene resin constituting the interlayer is, calculated by: multiplying the amount of each polystyrene resin in the mixed resin by the amount of the styrene component in the polystyrene resin; adding the obtained products together; and dividing the sum by 100.

The lower limit of the amount of a conjugated diene component in the polystyrene resin constituting the interlayer is preferably 10% by weight, more preferably 15% by weight and the upper limit thereof is preferably 40% by weight, more preferably 30% by weight.

When the polystyrene resin constituting the interlayer is a mixed resin containing multiple polystyrene resins in combination, the amount of the conjugated diene component in the polystyrene resin constituting the interlayer is calculated by: multiplying the amount of each polystyrene resin in the mixed resin by the amount of the conjugated diene component in the polystyrene resin; adding the obtained products together; and dividing the sum by 100.

The aromatic vinyl hydrocarbon-conjugated diene copolymer preferably contains a styrene-butadiene copolymer (SBS resin) for particularly excellent heat shrinkability. To produce a heat shrinkable multilayer film with fewer fish eyes, the aromatic vinyl hydrocarbon-conjugated diene copolymer preferably contains an aromatic vinyl hydrocarbon-conjugated diene copolymer containing 2-methyl-1,3-butadiene (isoprene) as the conjugated diene, such as a styrene-isoprene copolymer (SIS resin) or a styrene-isoprene-butadiene copolymer (SIBS resin).

The aromatic vinyl hydrocarbon-conjugated diene copolymer may contain any one of the SBS resin, SIS resin, and SIBS resin alone, or may contain more than one of them in combination. In the case of using more than one of the SBS resin, SIS resin, and SIBS resin, the resins may be dry-blended with each other, or the resins may be knead-pelletized at a specific composition through an extruder and the obtained compound resin may be used.

The lower limit of the Vicat softening temperature of the polystyrene resin is preferably 60° C. and the upper limit thereof is preferably 90° C.

The polystyrene resin having a Vicat softening temperature of 60° C. or higher allows the heat shrinkable multilayer film to have good low-temperature shrinkability, making it possible to prevent wrinkling when the film or the resulting label is attached to a container. The polystyrene resin having a Vicat softening temperature of 90° C. or lower can sufficiently increase the low-temperature shrinkability of the heat shrinkable multilayer film, making it possible to prevent the film or the resulting label from remaining partly unshrunk when the film or the resulting label is attached to a container.

The lower limit of the Vicat softening temperature is more preferably 65° C. and the upper limit thereof is more preferably 85° C.

The Vicat softening temperature can be measured by a method in conformity with ISO 306.

The lower limit of the melt flow rate (MFR) at 200° C. of the polystyrene resin is preferably 2 g/10 min and the upper limit thereof is preferably 15 g/10 min.

The polystyrene resin having a MFR at 200° C. of 2 g/10 min or higher can improve film formability. The polystyrene resin having a MFR at 200° C. of 15 g/10 min or lower can sufficiently improve the mechanical strength of the film.

The lower limit of the MFR is more preferably 4 g/10 min and the upper limit thereof is more preferably 12 g/10 min.

The MFR can be measured by a method in conformity with ISO1133.

The polystyrene resin constituting the interlayer is preferably a mixed resin of a polystyrene resin having a Vicat softening temperature of 80° C. or higher (hereinafter also referred to as a "high-softening-temperature polystyrene resin") and a polystyrene resin having a Vicat softening temperature of lower than 80° C. (hereinafter also referred to as a "low-softening-temperature polystyrene resin").

The lower limit of the amount of the high-softening-temperature polystyrene resin in the polystyrene resin constituting the interlayer is preferably 1% by weight, more preferably 5% by weight, and the upper limit thereof is preferably 50% by weight, more preferably 45% by weight.

The lower limit of the amount of the low-softening-temperature polystyrene resin in the polystyrene resin constituting the interlayer is preferably 50% by weight, more preferably 55% by weight, and the upper limit thereof is preferably 99% by weight, more preferably 95% by weight.

The difference in Vicat softening temperature between the high-softening-temperature polystyrene resin and the low-softening-temperature polystyrene resin is preferably 5° C. or more, more preferably 10° C. or more, while preferably 30° C. or less, more preferably 20° C. or less.

When the polystyrene resin constituting the interlayer is a mixed resin of the high-softening-temperature polystyrene resin and the low-softening-temperature polystyrene resin, the lower limit of the apparent Vicat softening temperature of the mixed resin is preferably 71.1° C., more preferably 71.5° C. and the upper limit thereof is preferably 76.0° C., more preferably 75.5° C.

The apparent Vicat softening temperature can be calculated by: multiplying the amount of the high-softening-temperature polystyrene resin in the polystyrene resin constituting the interlayer by the Vicat softening temperature of the high-softening-temperature polystyrene; multiplying the amount of the low-softening-temperature polystyrene resin in the polystyrene resin constituting the interlayer by the Vicat softening temperature of the low-softening-temperature polystyrene resin; adding up the obtained products; and dividing the obtained sum by 100.

Examples of commercially available polystyrene resins to constitute the interlayer include "CLEAREN" (produced by Denki Kagaku Kogyo Kabushiki Kaisha), "Asaflex" (produced by Asahi Kasei Chemicals Corporation), "Styrolux" (produced by BASF SE), and "PSJ-polystyrene" (produced by PS Japan Corporation).

The lower limit of the amount of the polystyrene resin in the interlayer is 80% by weight and the upper limit thereof is 99% by weight.

When the amount of the polystyrene resin is not lower than the lower limit and not higher than the upper limit, the resulting heat shrinkable multilayer film or the resulting heat shrinkable label can be easily torn along the perforation both in the MD and TD.

The lower limit of the amount of the polystyrene resin in the interlayer is preferably 85% by weight, more preferably 87% by weight and the upper limit thereof is preferably 97% by weight, more preferably 95% by weight.

The interlayer further contains a polyester resin.

Examples of polyester resins usable in the interlayer include the same polyester resins as those usable in the front and back layers.

The polyester resin may be the same as or different from the polyester resin constituting the front and back layers.

The lower limit of the amount of the polyester resin in the interlayer is 1% by weight and the upper limit thereof is 20% by weight.

When the amount of the polyester resin is not lower than the lower limit and not higher than the upper limit, the resulting heat shrinkable multilayer film or the resulting heat shrinkable label can be easily torn along the perforation both in the MD and TD.

The lower limit of the amount of the polyester resin in the interlayer is preferably 3% by weight, more preferably 5% by weight and the upper limit thereof is preferably 15% by weight, more preferably 13% by weight.

The interlayer may further contain a polyester elastomer.

Examples of the polyester elastomer include the same polyester elastomers as those usable in the adhesive layers described later.

The lower limit of the amount of the polyester elastomer in the interlayer is preferably 0% by weight, more preferably 0.1% by weight, and the upper limit thereof is preferably 1.0% by weight, more preferably 0.7% by weight.

The interlayer may further contain a styrene elastomer.

Examples of the styrene elastomer include the same styrene elastomers as those usable in the adhesive layers described later.

The lower limit of the amount of the styrene elastomer in the interlayer is preferably 0% by weight, more preferably 2% by weight and the upper limit thereof is preferably 10% by weight, more preferably 7% by weight.

The interlayer preferably has a sea-island structure in which a polyester resin as a dispersed phase is dispersed in a polystyrene resin as a continuous phase.

The sea-island structure allows formation of a dispersed phase stretched in the TD in a heat shrinkable multilayer film stretched in the TD. This can improve the ease of tearing along the perforation in the TD.

The lower limit of the average dispersion diameter of the dispersed phase is preferably 50 nm, more preferably 70 nm and the upper limit thereof is preferably 2000 nm, more preferably 1800 nm.

The average dispersion diameter can be determined by capturing an image of the interlayer portion of the heat shrinkable multilayer film using an electron microscope and calculating the average diameter of the dispersed phase in the obtained image.

The interlayer may contain additives such as antioxidants, heat stabilizers, ultraviolet absorbers, light stabilizers, lubricants, antistatic agents, flame retardants, antimicrobials, fluorescent brighteners, and colorants, if necessary.

(Adhesive Layer)

The heat shrinkable multilayer film of the present invention has a structure in which the front and back layers and the interlayer are stacked with adhesive layers interposed therebetween.

The presence of the adhesive layers can increase the adhesive strength between the layers of the heat shrinkable multilayer film.

The adhesive layers each preferably contain a polystyrene resin, a polyester resin, a styrene elastomer, or a polyester elastomer.

The polystyrene resin constituting the adhesive layers preferably contains an aromatic vinyl hydrocarbon-conjugated diene copolymer because it has particularly excellent adhesiveness. In particular, the polystyrene resin preferably contains a styrene-butadiene copolymer (SBS resin). In order to produce a heat shrinkable multilayer film having better adhesiveness, the polystyrene resin preferably contains an aromatic vinyl hydrocarbon-conjugated diene copolymer containing 2-methyl-1,3-butadiene (isoprene) as the conjugated diene, such as a styrene-isoprene copolymer (SIS resin) or a styrene-isoprene-butadiene copolymer (SIBS resin).

The polystyrene resin may contain any one of the SBS resin, SIS resin, and SIBS resin, or may contain more than one of them in combination. In the case of using more than one of the SBS resin, SIS resin, and SIBS resin in combination, the resins may be dry-blended with each other, or the resins may be knead-pelletized at a specific composition through an extruder and the obtained compound resin may be used.

The lower limit of the amount of a styrene component in the polystyrene resin constituting the adhesive layers is preferably 50% by weight, more preferably 60% by weight and the upper limit thereof is preferably 90% by weight, more preferably 85% by weight.

The lower limit of the amount of a conjugated diene component in the polystyrene resin constituting the adhesive layers is preferably 10% by weight, more preferably 15% by weight and the upper limit thereof is preferably 50% by weight, more preferably 40% by weight.

The amount of the styrene component in the polystyrene resin constituting the adhesive layers is preferably smaller than the amount of the styrene component in the polystyrene resin constituting the interlayer.

The lower limit of the Vicat softening temperature of the polystyrene resin constituting the adhesive layers is preferably 55° C. and the upper limit thereof is preferably 85° C.

The polystyrene resin having a Vicat softening temperature of 55° C. or higher can prevent layers from separating from each other due to heating during attaching a heat shrinkable label including the heat shrinkable multilayer film as a base film to a container. The polystyrene resin having a Vicat softening temperature of 85° C. or lower can sufficiently improve the interlayer adhesive strength of the heat shrinkable multilayer film.

The lower limit of the Vicat softening temperature is more preferably 60° C., still more preferably 65° C. and the upper limit thereof is more preferably 80° C.

The Vicat softening temperature can be measured by a method in conformity with ISO 306.

The Vicat softening temperature of the polystyrene resin constituting the adhesive layers is preferably higher than the Vicat softening temperature of the polystyrene resin constituting the interlayer.

When the polystyrene resin constituting the interlayer is a mixed resin containing multiple polystyrene resins in combination, the "Vicat softening temperature of the polystyrene resin constituting the interlayer" means an apparent Vicat softening temperature calculated based on the amount of each polystyrene resin in the polystyrene resin constituting the interlayer and the Vicat softening temperature of each resin.

The lower limit of the melt flow rate (MFR) at 200° C. of the polystyrene resin constituting the adhesive layers is preferably 2 g/10 min and the upper limit thereof is preferably 15 g/10 min.

The polystyrene resin having a MFR at 200° C. of 2 g/10 min or higher is less likely to cause resin stagnation in an extruder, and thus can prevent formation of impurities such as gel. The polystyrene resin having a MFR at 200° C. of 15 g/10 min or lower allows the pressure during the film formation step to be uniform, which allows the thickness to be uniform.

The lower limit of the MFR is more preferably 4 g/10 min and the upper limit thereof is more preferably 12 g/10 min.

The MFR can be measured by a method in conformity with ISO1133.

The polystyrene resin may be the same as or different from that constituting the interlayer.

The lower limit of the amount of the polystyrene resin in each adhesive layer is preferably 10% by weight, more preferably 20% by weight, and the upper limit thereof is preferably 95% by weight, more preferably 80% by weight.

The polyester resin constituting the adhesive layers may be one obtainable by polycondensation of a dicarboxylic acid and a diol.

The dicarboxylic acid is not limited. Examples thereof include o-phthalic acid, terephthalic acid, isophthalic acid, succinic acid, adipic acid, sebacic acid, azelaic acid, octylsuccinic acid, cyclohexane dicarboxylic acid, naphthalene dicarboxylic acid, fumaric acid, maleic acid, itaconic acid, decamethylene carboxylic acid, anhydrides thereof, and lower alkyl esters thereof.

The diol is not limited. Examples thereof include aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol (2,2-dimethylpropane-1,3-diol), 1,2-hexanediol, 2,5-hexanediol, 2-methyl-2,4-pentanediol, 3-methyl-1,3-pentanediol, and 2-ethyl-1,3-hexanediol; and alicyclic diols such as 2,2-bis(4-hydroxycyclohexyl)propane, adducts of alkylene oxide with 2,2-bis(4-hydroxycyclohexyl)propane, 1,4-cyclohexanediol, and 1,4-cyclohexanedimethanol.

Suitable among the polyester resins are those containing a component derived from terephthalic acid as a dicarboxylic acid component and a component derived from ethylene glycol and 1,4-cyclohexanedimethanol as a diol component.

Also suitable as the polyester resin are those containing a component derived from terephthalic acid as a dicarboxylic acid component and a component derived from 1,4-butanediol as a diol component.

The lower limit of the glass transition temperature of the polyester resin is preferably 30° C., more preferably 55° C. and the upper limit thereof is preferably 95° C., more preferably 90° C.

The glass transition temperature can be measured with a differential scanning calorimeter (DSC).

The lower limit of the tensile modulus of elasticity of the polyester resin is preferably 1000 MPa, more preferably 1500 MPa and the upper limit thereof is preferably 4000 MPa, more preferably 3700 MPa.

The tensile modulus of elasticity can be measured by a method in conformity with ASTM-D992 (Test A).

The polyester resin may be the same as or different from that constituting the front and back layers.

Examples of the styrene elastomer constituting the adhesive layers include: resins constituted by polystyrene as a hard segment and polybutadiene, polyisoprene, or a copolymer of polybutadiene and polyisoprene as a soft segment; and hydrogenated products thereof. In the hydrogenated products, polybutadiene, polyisoprene, and the like may be partially or entirely hydrogenated.

The styrene elastomer may be a modified product.

Examples of the modified product of the styrene elastomer include those obtained by modifying the styrene elastomer with a functional group such as a carboxylic acid group, an acid anhydride group, an amino group, an epoxy group, or a hydroxy group.

In the modified product of the styrene elastomer, the lower limit of the amount of the functional group is preferably 0.05% by weight and the upper limit thereof is preferably 5.0% by weight.

When the amount of the functional group is 0.05% by weight or more, the interlaminar strength of the heat shrinkable multilayer film can be sufficiently increased. When the amount of the functional group is 5.0% by weight or less, formation of impurities such as gel due to thermal degradation of the styrene elastomer can be reduced.

The lower limit of the amount of the functional group is more preferably 0.1% by weight and the upper limit thereof is more preferably 3.0% by weight.

Examples of commercially available styrene elastomers or commercially available modified products of styrene elastomers include "Tuftec" and "Tufprene" (both produced by Asahi Kasei Chemicals Corporation), "Kraton" (produced by Kraton Polymers Japan Ltd), "DYNARON", "JSR TR", and "JSR SIS" (all produced by JSR Corporation), and "SEPTON" (produced by Kuraray Co., Ltd.).

The polyester elastomer is constituted by a polyester as a hard segment and a polyether or polyester as a soft segment having high rubber elasticity. Specific examples of the polyester elastomer include block copolymers containing an aromatic polyester as a hard segment and an aliphatic polyether or aliphatic polyester as a soft segment. The polyester elastomer is preferably a saturated polyester elastomer, particularly preferably a saturated polyester elastomer containing a polyalkylene ether glycol segment as a soft segment.

For example, the saturated polyester elastomer containing a polyalkylene ether glycol segment is preferably a block copolymer containing an aromatic polyester as a hard segment and a polyalkylene ether glycol as a soft segment.

When the polyester elastomer used is a block copolymer containing an aromatic polyester and a polyalkylene ether glycol, the lower limit of the proportion of the segment constituted by the polyalkylene ether glycol is preferably 5% by weight and the upper limit thereof is preferably 90% by weight.

When the proportion of the segment constituted by the polyalkylene ether glycol is 5% by weight or more, the adhesiveness to the interlayer can be sufficiently increased. When the proportion is 90% by weight or less, the adhesiveness to the front and back layers can be sufficiently increased.

The lower limit of the proportion of the segment constituted by the polyalkylene ether glycol is more preferably 30% by weight, still more preferably 55% by weight and the upper limit thereof is more preferably 80% by weight.

Examples of the polyalkylene ether glycol include polyethylene glycol, poly(propylene ether)glycol, poly(tetramethylene ether)glycol, and poly(hexanemethylene ether)glycol.

The lower limit of the number average molecular weight of the polyalkylene ether glycol is preferably 400, more preferably 600, still more preferably 1000 and the upper limit thereof is preferably 6000, more preferably 4000, still more preferably 3000.

When the number average molecular weight is within the above preferable range, the interlayer strength can be further improved.

The number average molecular weight can be measured by gel permeation chromatography (GPC).

The polyester elastomer may be produced by any method. For example, it may be produced as follows: an oligomer is obtained by esterification reaction or transesterification reaction using, as raw materials, (i) a C2-C12 aliphatic and/or alicyclic diol, (ii) an aromatic dicarboxylic acid and/or an alicyclic dicarboxylic acid or an ester thereof, and (iii) a polyalkylene ether glycol having a number average molecular weight of 400 to 6000, and then the oligomer is subjected to polycondensation.

Examples of the C2-C12 aliphatic and/or alicyclic diol include those commonly used as raw materials of polyesters, especially raw materials of polyester thermoplastic elastomers. Specific examples thereof include ethylene glycol, propylene glycol, trimethylene glycol, 1,4-butanediol, 1,4-cyclohexanediol, and 1,4-cyclohexanedimethanol. Preferred among these are ethylene glycol and 1,4-butanediol. More preferred is 1,4-butanediol.

These may be used alone or in combination of two or more thereof.

Examples of the aromatic dicarboxylic acid and/or alicyclic dicarboxylic acid include those commonly used as raw materials of polyesters, especially raw materials of polyester thermoplastic elastomers. Specific examples thereof include terephthalic acid, isophthalic acid, phthalic acid, 2,6-naphthalenedicarboxylic acid, and cyclohexanedicarboxylic acid. Preferred among these are terephthalic acid and 2,6-naphthalenedicarboxylic acid. More preferred is terephthalic acid.

These may be used alone or in combination of two or more thereof.

Examples of commercially available polyester elastomers include "PRIMALLOY" (produced by Mitsubishi Chemical Corporation), "PELPRENE" (produced by Toyobo Co., Ltd.), and "Hytrel" (produced by Du Pont-Toray Co., Ltd.).

The lower limit of the melting point of the polyester elastomer is preferably 120° C. and the upper limit thereof is preferably 200° C.

The polyester elastomer having a melting point of 120° C. or higher can sufficiently increase heat resistance, and thus can prevent separation occurring from the solvent seal portion when the heat shrinkable multilayer film is attached to a container as a heat shrinkable label. The polyester elastomer having a melting point of 200° C. or lower can sufficiently increase adhesive strength.

The lower limit of the melting point is more preferably 130° C. and the upper limit thereof is more preferably 190° C.

The melting point can be measured using, for example, a differential scanning calorimeter (produced by Shimadzu Corporation, DSC-60) at a temperature increase rate of 10° C./min.

The melting point of the polyester elastomer is affected by the copolymerization ratio between the polyester as a hard segment and the polyether or polyester as a soft segment, and the structure.

The melting point of the polyester elastomer usually tends to depend on the copolymerization amount of the polyether or polyester as a soft segment. A larger copolymerization amount of the polyether or polyester leads to a lower melting point, whereas a smaller copolymerization amount thereof leads to a higher melting point.

The melting point of the polyester as a hard segment constituting the polyester elastomer may be adjusted by changing the copolymerization components of the polyester, and thereby the melting point of the entire polyester elastomer may be adjusted.

Decreasing the molecular weight of the polyether or polyester as a soft segment decreases the block properties of the resulting polyester elastomer, and thus tends to decrease the melting point.

The lower limit of the durometer hardness of the polyester elastomer is preferably 10 and the upper limit thereof is preferably 80.

The polyester elastomer having a durometer hardness of 10 or more can improve the mechanical strength of the adhesive layers. The polyester elastomer having a durometer hardness of 80 or less can improve the flexibility and impact resistance of the adhesive layers.

The lower limit of the durometer hardness is more preferably 15, still more preferably 20, and the upper limit thereof is more preferably 70, still more preferably 60.

The durometer hardness can be measured by a method in conformity with ISO18517 using a durometer (type D).

The lower limit of the specific gravity of the polyester elastomer is preferably 0.95 and the upper limit thereof is preferably 1.20.

The polyester elastomer having a specific gravity of 0.95 or higher can sufficiently increase heat resistance and can prevent separation occurring from the solvent seal portion when the heat shrinkable multilayer film is attached to a container as a heat shrinkable label. The polyester elastomer having a specific gravity of 1.20 or lower can sufficiently increase adhesive strength.

The lower limit of the specific gravity is more preferably 0.98 and the upper limit thereof is more preferably 1.18.

The specific gravity can be measured by a method in conformity with ISO 1183-using a water displacement method.

The adhesive layers each may contain the polystyrene resin, the polyester resin, the styrene elastomer, or the polyester elastomer alone, or may contain two or more of them in combination.

When the adhesive layers each contain a mixed resin of the polystyrene resin and the polyester elastomer, the lower limit of the amount of the polystyrene resin in each adhesive layer is preferably 20% by weight, more preferably 25% by weight and the upper limit thereof is preferably 80% by weight, more preferably 75% by weight.

The lower limit of the amount of the polyester elastomer in each adhesive layer is preferably 20% by weight, more preferably 25% by weight and the upper limit thereof is preferably 80% by weight, more preferably 75% by weight.

When the adhesive layers each contain a mixed resin of the polystyrene resin and the polyester resin, the lower limit of the amount of the polystyrene resin in each adhesive layer is preferably 20% by weight, more preferably 25% by weight, and the upper limit thereof is preferably 80% by weight, more preferably 75% by weight.

The lower limit of the amount of the polyester resin in each adhesive layer is preferably 20% by weight, more preferably 25% by weight and the upper limit thereof is preferably 80% by weight, more preferably 75% by weight.

When the adhesive layers each contain a mixed resin of the polyester resin and the styrene elastomer, the lower limit of the amount of the polyester resin in each adhesive layer is preferably 20% by weight, more preferably 25% by weight, and the upper limit thereof is preferably 80% by weight, more preferably. 75% by weight.

The lower limit of the amount of the styrene elastomer in each adhesive layer is preferably 20% by weight, more preferably 25% by weight and the upper limit thereof is preferably 80% by weight, more preferably 75% by weight.

When the adhesive layers each contain a mixed resin of the polystyrene resin, the polyester resin, and the styrene elastomer or polyester elastomer, the lower limit of the amount of the polystyrene resin in each adhesive layer is preferably 10% by weight, more preferably 20% by weight and the upper limit thereof is preferably 80% by weight, more preferably 75% by weight.

The lower limit of the amount of the polyester resin in each adhesive layer is preferably 10% by weight, more preferably 20% by weight and the upper limit thereof is preferably 80% by weight, more preferably 75% by weight.

The lower limit of the amount of the styrene elastomer or polyester elastomer in each adhesive layer is preferably 2% by weight, more preferably 4% by weight and the upper limit thereof is preferably 10% by weight, more preferably 8% by weight.

The adhesive layers may contain additives such as antioxidants, heat stabilizers, ultraviolet absorbers, light stabilizers, lubricants, antistatic agents, flame retardants, antimicrobials, fluorescent brighteners, and colorants, if necessary.

(Characteristics of Heat Shrinkable Multilayer Film)

The lower limit of the overall thickness of the heat shrinkable multilayer film of the present invention is preferably 10 μm, more preferably 15 μm, still more preferably 20 μm and the upper limit thereof is preferably 100 μm, more preferably 80 μm, still more preferably 70 μm.

The heat shrinkable multilayer film having an overall thickness within the above range can be excellent in heat shrinkability, converting properties (e.g., printing properties, center sealing properties), and attachability.

In the heat shrinkable multilayer film of the present invention, the lower limit of the thickness of the front and back layers is preferably 7%, more preferably 8% of the overall thickness of the heat shrinkable multilayer film and the upper limit thereof is preferably 18%, more preferably 16% the overall thickness of the heat shrinkable multilayer film.

The thickness of the front and back layers means the thickness of the front layer or back layer, not the total thickness of the front and back layers.

In the heat shrinkable multilayer film of the present invention, the lower limit of the thickness of the interlayer is preferably 60%, more preferably 65% of the overall thickness of the heat shrinkable multilayer film and the upper limit thereof is preferably 84%, more preferably 82% of the overall thickness of the heat shrinkable multilayer film.

In the heat shrinkable multilayer film of the present invention, the lower limit of the thickness of each adhesive layer is preferably 0.3 µm and the upper limit thereof is preferably 3.0 µm.

The adhesive layer having a thickness of 0.3 µm or more can exhibit sufficient adhesiveness. The adhesive layer having a thickness of 3.0 µm or less can impart sufficient heat shrinkage properties and optical characteristics to the heat shrinkable multilayer film.

The lower limit of the thickness of each adhesive layer is more preferably 0.5 µm and the upper limit thereof is more preferably 2.0 µm.

The overall thickness of the heat shrinkable multilayer film can be adjusted by subtracting the thickness of the adhesive layers and then adjusting the thickness of the front and back layers and the thickness of the interlayer.

In the heat shrinkable multilayer film of the present invention, the lower limit of the heat shrinkage ratio in the main shrinkage direction (TD) when the film is immersed in hot water at 70° C. for 10 seconds (hereinafter also referred to as a "TD heat shrinkage ratio (70° C.×10 sec)") is preferably 15%, and the upper limit thereof is preferably 50%.

The heat shrinkable multilayer film having a TD heat shrinkage ratio (70° C.×10 sec) of 15% or higher can achieve good shrink finish quality. The heat shrinkable multilayer film having a TD heat shrinkage ratio (70° C.×10 sec) of 50% or lower can reduce natural shrinkage.

The lower limit of the TD heat shrinkage ratio (70° C.×10 sec) is more preferably 20%, still more preferably 25%, particularly preferably 30%, and the upper limit thereof is more preferably 47%, still more preferably 45%.

The heat shrinkage ratio can be calculated from the ratio between the length measured after heat shrinking at a given temperature for a given time and the length before the heat shrinking.

In the heat shrinkable multilayer film of the present invention, the lower limit of the heat shrinkage ratio in the main shrinkage direction (TD) when the film is immersed in hot water at 80° C. for 10 seconds (hereinafter also referred to as a "TD heat shrinkage ratio (80° C.×10 sec)") is preferably 50%, and the upper limit thereof is preferably 70%.

The heat shrinkable multilayer film having a TD heat shrinkage ratio (80° C.×10 sec) of 50% or higher can prevent wrinkling and the like in shrinking. The heat shrinkable multilayer film having a TD heat shrinkage ratio (80° C.×10 sec) of 70% or lower can prevent appearance defects such as sliding-up of the label in shrinking.

The lower limit of the TD heat shrinkage ratio (80° C.×10 sec) is more preferably 55%, still more preferably 58%, particularly preferably 60%, and the upper limit thereof is more preferably 69%, still more preferably 68%, particularly preferably 67%.

In the heat shrinkable multilayer film of the present invention, the lower limit of the heat shrinkage ratio in the main shrinkage direction (TD) when the film is immersed in hot water at 100° C. for 10 seconds (hereinafter also referred to as a "TD heat shrinkage ratio (100° C.×10 sec)") is preferably 65%, and the upper limit thereof is preferably 85%.

The heat shrinkable multilayer film having a TD heat shrinkage ratio (100° C.×10 sec) of 65% or higher can prevent wrinkling and the like in shrinking. The heat shrinkable multilayer film having a TD heat shrinkage ratio (100° C.×10 sec) of 85% or lower can prevent appearance defects such as sliding-up of the label in shrinking.

The lower limit of the TD heat shrinkage ratio (100° C.×10 sec) is more preferably 70%, still more preferably 75%, and the upper limit thereof is more preferably 83%, still more preferably 82%.

In the heat shrinkable multilayer film of the present invention, the lower limit of the maximum shrinkage stress when the film is immersed in hot water at 80° C. for 30 seconds is preferably 3.5 MPa, and the upper limit thereof is preferably 11 MPa.

The heat shrinkable multilayer film having a maximum shrinkage stress of 3.5 MPa or more can sufficiently increase the shrink finish quality when the film or the resulting label is attached to a container. The heat shrinkable multilayer film having a maximum shrinkage stress of 11 MPa or less can reduce misalignment of layers at the label center seal portion. In addition, such heat shrinkable multilayer film can prevent container deformation when the film or the resulting label is attached to a container.

The lower limit of the maximum shrinkage stress is more preferably 4.5 MPa and the upper limit thereof is more preferably 10 MPa.

The "maximum shrinkage stress" refers to the maximum value of shrinkage stress measured when the heat shrinkable multilayer film is immersed in hot water at 80° C. for 30 seconds.

In the heat shrinkable multilayer film of the present invention, the lower limit of the interlaminar strength (adhesive strength) in the direction (MD) perpendicular to the main shrinkage direction is preferably 0.8 N/10 mm and the upper limit thereof is preferably 2 N/10 mm.

The heat shrinkable multilayer film having an interlaminar strength in the MD within the above range can prevent delamination when the heat shrinkable label is attached to a container.

The lower limit of the interlaminar strength is more preferably 0.9 N/10 mm, still more preferably 1 N/10 mm.

In the heat shrinkable multilayer film of the present invention, the lower limit of the interlaminar strength in the main shrinkage direction (TD) is preferably 0.5 N/10 mm and the upper limit thereof is preferably to 2 N/10 mm.

The heat shrinkable multilayer film having an interlaminar strength in the TD within the above range can prevent delamination due to friction during transportation of labelled containers.

The lower limit of the interlaminar strength is more preferably 0.65 N/10 mm, still more preferably 0.8 N/10 mm.

In the heat shrinkable multilayer film of the present invention, the upper limit of the tear strength in the main shrinkage direction (TD) is preferably 200 mN.

In the heat shrinkable multilayer film of the present invention, the lower limit of the tear strength in the direction (MD) perpendicular to the main shrinkage direction is preferably 1000 mN and the upper limit thereof is preferably 3000 mN.

The tear strength can be measured by a method in conformity with ISO 6383-2.

In the heat shrinkable multilayer film of the present invention, the lower limit of the puncture resistance is preferably 0.3 J.

The puncture resistance can be measured by a method in conformity with ISO 3036:1975.

The heat shrinkable multilayer film of the present invention may be produced by any method, and is preferably produced by simultaneously forming all the layers by a co-extrusion method. When the co-extrusion method is co-extrusion using a T-die, the layers may be stacked by a feed block technique, a multi-manifold technique, or a combination thereof.

Specifically, for example, the heat shrinkable multilayer film of the present invention may be produced by feeding the raw materials to constitute the front and back layers, the interlayer, and the adhesive layers into extruders, extruding them into a sheet through a multilayer die, and cooling and solidifying the sheet on a take-up roll, followed by uniaxial or biaxial stretching.

The stretching can be performed by, for example, a roll stretching method, a tenter stretching method, or a combination thereof. The stretching temperature is adjusted according to the softening temperatures of the resins constituting the film or the shrinkage properties required of the heat shrinkable multilayer film. The lower limit of the stretching temperature is preferably 65° C., more preferably 70° C. and the upper limit thereof is preferably 120° C., more preferably 115° C. The stretching ratio in the main shrinkage direction is changed according to the resins constituting the film, the stretching means, the stretching temperature, and the like. The stretching ratio is preferably 3 times or more, more preferably 4 times or more and is preferably 7 times or less, more preferably 6 times or less. With such stretching temperature and stretching ratio, the film can achieve excellent thickness precision, and also can prevent the front or back layer on the inner side from remaining alone on the container due to delamination in tearing the film along the perforation.

The heat shrinkable multilayer film of the present invention can be used in any application. The heat shrinkable multilayer film of the present invention has high interlaminar strength, and thus reduces delamination when the film after being attached to a container is scratched at the overlap portion and when the film is torn along the perforation. The heat shrinkable multilayer film also has excellent transparency. Thus, for example, the heat shrinkable multilayer film can be suitably used as a base film of a heat shrinkable label to be attached to a container such as a plastic bottle or a metal can. The heat shrinkable label including the heat shrinkable multilayer film of the present invention is also encompassed by the present invention.

Advantageous Effects of Invention

The present invention can provide a heat shrinkable multilayer film capable of providing a heat shrinkable label that can be easily torn along the perforation in both the TD and MD and also has excellent impact resistance and transparency.

DESCRIPTION OF EMBODIMENTS

The following will describe the present invention in detail referring to examples, but the present invention should not be limited to these examples.

The following materials were used in examples and comparative examples.

(Polyester Resin)

Polyester resin A: polyester resin (glass transition temperature: 69° C.) containing a dicarboxylic acid component (component derived from terephthalic acid: 100 mol %) and a diol component (component derived from ethylene glycol: 65 mol %, component derived from diethylene glycol: 20 mol %, component derived from 1,4-cyclohexanedimethanol: 15 mol %) (Polystyrene resin)

Polystyrene resin A: styrene-butadiene copolymer (styrene content: 81.3% by weight, butadiene content: 18.7% by weight, Vicat softening temperature: 81° C.)

Polystyrene resin B: styrene-butadiene copolymer (styrene content: 77.7% by weight, butadiene content: 22.3% by weight, Vicat softening temperature: 71° C.)

Polystyrene resin C: styrene-butadiene copolymer (styrene content: 72% by weight, butadiene content: 28% by weight, Vicat softening temperature: 76° C.)

(Polyester Elastomer)

Elastomer A: non-modified polyester-polyether block copolymer containing a polyester as a hard segment and a polyether as a soft segment (durometer hardness: 55, glass transition temperature: 45° C., Vicat softening temperature: 126° C., melting point: 191° C., specific gravity: 1.17)

Example 1

An amount of 100% by weight of polyester resin A was used as a resin to constitute the front and back layers.

A mixed resin containing 30% by weight of elastomer A and 70% by weight of polystyrene resin C was used as a resin to constitute the adhesive layers.

A mixed resin containing 15% by weight of polyester resin A, 25% by weight of polystyrene resin A, and 60% by weight of polystyrene resin B was used as a resin to constitute the interlayer.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 40 μm and had a five-layer structure (front layer (5.7 μm)/adhesive layer (0.7 μm)/interlayer (27.2 μm)/adhesive layer (0.7 μm)/back layer (5.7 μm)).

Example 2

An amount of 100% by weight of polyester resin A was used as a resin to constitute the front and back layers.

A mixed resin containing 65% by weight of elastomer A and 35% by weight of polystyrene resin C was used as a resin to constitute the adhesive layers.

A mixed resin containing 15% by weight of polyester resin A, 25% by weight of polystyrene resin A, and 60% by weight of polystyrene resin B was used as a resin to constitute the interlayer.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 50 μm and had a five-layer structure (front layer (7 μm)/adhesive layer (1 μm)/interlayer (34 μm)/adhesive layer (1 μm)/back layer (7 μm)).

Example 3

A heat shrinkable multilayer film was obtained as in Example 1 except that a mixed resin containing 5% by weight of polyester resin A, 28% by weight of polystyrene resin A, and 67% by weight of polystyrene resin B was used as a resin to constitute the interlayer.

Example 4

A heat shrinkable multilayer film was obtained as in Example 1 except that a mixed resin containing 10% by weight of polyester resin A, 27% by weight of polystyrene resin A, and 63% by weight of polystyrene resin B was used as a resin to constitute the interlayer.

Comparative Example 1

An amount of 100% by weight of polyester resin A was used as a resin to constitute the front and back layers.

A mixed resin containing 30% by weight of elastomer A and 70% by weight of polystyrene resin C was used as a resin to constitute the adhesive layers.

A mixed resin containing 30% by weight of polystyrene resin A and 70% by weight of polystyrene resin B was used as a resin to constitute the interlayer.

These resins were fed into extruders having a barrel temperature of 160° C. to 250° C., extruded into a five-layer sheet through a multilayer die at 250° C., and cooled and solidified on a take-up roll at 30° C. Subsequently, the sheet was stretched at stretching ratio of 6 times in a tenter stretching machine with a preheating zone set at 105° C., a stretching zone set at 90° C., and a heat setting zone set at 85° C., and then wound with a winder. Thus, a heat shrinkable multilayer film was obtained in which the direction perpendicular to the main shrinkage direction was the MD and the main shrinkage direction was the TD.

The obtained heat shrinkable multilayer film had a total thickness of 40 μm and had a five-layer structure (front layer (5.7 μm)/adhesive layer (0.7 μm)/interlayer (27.2 μm)/adhesive layer (0.7 μm)/back layer (5.7 μm)).

(Evaluation)

The heat shrinkable multilayer films obtained in the examples and the comparative examples were evaluated as follows.

Table 1 shows the results.

(1) Tear Strength in MD and TD

The tear strength in the MD and the TD was measured in conformity with ISO 6383-2 using HEIDON TYPE:17 produced by Shinto Scientific Co., Ltd.

(2) Puncture Resistance

The puncture resistance was measured in conformity with ISO 3036:1975 using a film impact tester produced by Toyo Seiki Seisaku-Sho, Ltd.

(3) Ease of Tearing Along Perforation

Thirty plastic bottles to which shrink labels were attached (without delamination or wrinkles) were prepared. For each bottle, the shrink label was removed by tearing with hands along the perforation. The state at this time was observed and the ease of tearing along perforation was evaluated in accordance with the following criteria.

Good: The shrink labels were torn along the perforation in the MD and TD and easily removed.

Poor: At least one of the shrink labels was not torn along the perforation and difficult to remove.

(4) Haze

The haze was measured in conformity with ISO 14782 using NDH5000 produced by Nippon Denshoku Industries Co., Ltd.

TABLE 1

| | | | | Example | | | | Comparative Example |
|---|---|---|---|---|---|---|---|---|
| | | | | 1 | 2 | 3 | 4 | 1 |
| Heat shrinkable multilayer film | Front and back layers | Polyester resin (% by weight) | Polyester resin A (glass transition temperature: 69° C.) | 100 | 100 | 100 | 100 | 100 |
| | | Thickness (μm) | | 5.7 | 7 | 5.7 | 5.7 | 5.7 |
| | Adhesive layers | Polyester elastomer (% by weight) | Elastomer A (glass transition temperature: 45° C. Vicat softening temperature: 126° C.) | 30 | 65 | 30 | 30 | 30 |
| | | Polystyrene resin (% by weight) | Polystyrene resin C (Vicat softening temperature: 76° C.) | 70 | 35 | 70 | 70 | 70 |
| | | | Amount of styrene component (% by weight) | 72 | 72 | 72 | 72 | 72 |
| | | | Amount of conjugated diene component (% by weight) | 28 | 28 | 28 | 28 | 28 |
| | | Thickness (μm) | | 0.7 | 1 | 0.7 | 0.7 | 0.7 |
| | Interlayer | Polyester resin (% by weight) | Polyester resin A (glass transition temperature: 69° C.) | 15 | 15 | 5 | 10 | — |
| | | Polystyrene resin (% by weight) | Polystyrene resin A (Vicat softening temperature: 81° C.) | 25 | 25 | 28 | 27 | 30 |

TABLE 1-continued

|  |  |  | Example | | | | Comparative Example |
|---|---|---|---|---|---|---|---|
|  |  |  | 1 | 2 | 3 | 4 | 1 |
|  |  | Polystyrene resin B (Vicat softening temperature: 71° C.) | 60 | 60 | 67 | 63 | 70 |
|  |  | Amount of styrene component (% by weight) | 78.8 | 78.8 | 78.8 | 78.8 | 78.8 |
|  |  | Amouont of conjugated diene component (% by weight) | 21.2 | 21.2 | 21.2 | 21.2 | 21.2 |
|  |  | Apparent Vicat softening temperature (° C.) | 74 | 74 | 74 | 74 | 74 |
|  | Thickness (μm) |  | 27.2 | 34 | 27.2 | 27.2 | 27.2 |
|  | Total thickness (μm) |  | 40 | 50 | 40 | 40 | 40 |
| Evaluation | Tear strength (mN) | MD | 1201 | 2193 | 1221 | 1226 | 665 |
|  |  | TD | 129 | 164 | 160 | 158 | 196 |
|  | Puncture resistance (J) |  | 0.82 | 0.89 | 0.79 | 0.80 | 0.44 |
|  | Ease of tearing along perforation |  | Good | Good | Good | Good | Poor |
|  | Haze (%) |  | 6.3 | 6.5 | 4.5 | 5.5 | 4.3 |

INDUSTRIAL APPLICABILITY

The present invention can provide a heat shrinkable multilayer film capable of providing a heat shrinkable label that can be easily torn along the perforation in both the TD and MD and also has excellent impact resistance and transparency.

The invention claimed is:

1. A heat shrinkable multilayer film comprising:
    front and back layers;
    an interlayer; and
    adhesive layers,
    wherein the front and back layers and the interlayer are stacked with the adhesive layers interposed therebetween,
    the front and back layers each contain a polyester resin,
    the interlayer contains an aromatic vinyl hydrocarbon-conjugated diene copolymer in an amount of 80 to 99% by weight and a polyester resin in an amount of 1 to 20% by weight,
    the aromatic vinyl hydrocarbon-conjugated diene copolymer in the interlayer represents all of a styrene-containing polymer in the interlayer, and
    the aromatic vinyl hydrocarbon-conjugated diene copolymer constituting the interlayer is a mixed resin of 50 to 99% by weight of an aromatic vinyl hydrocarbon-conjugated diene copolymer having a Vicat softening temperature of lower than 80° C. and 1 to 50% by weight of an aromatic vinyl hydrocarbon-conjugated diene copolymer having a Vicat softening temperature of 80° C. or higher.

2. The heat shrinkable multilayer film according to claim 1,
    wherein the adhesive layers each contain a polystyrene resin, a polyester resin, a styrene elastomer, or a polyester elastomer.

3. The heat shrinkable multilayer film according to claim 1,
    wherein the interlayer further contains a styrene elastomer or a polyester elastomer.

4. The heat shrinkable multilayer film according to claim 1,
    wherein the polyester resin constituting the interlayer has a glass transition temperature of 30° C. to 95° C.

5. A heat shrinkable label comprising
    the heat shrinkable multilayer film according to claim 1.

* * * * *